United States Patent [19] [11] 4,128,230
Maubon [45] Dec. 5, 1978

[54] INSTALLATION FOR THE COLLECTION OF GASES EMITTED BY A TILTABLE CONVERTER

[75] Inventor: Andre Maubon, Saint-Etienne, France

[73] Assignee: Clesid S.A., Saint-Chamond, France

[21] Appl. No.: 807,342

[22] Filed: Jun. 16, 1977

[30] Foreign Application Priority Data
Jul. 28, 1976 [FR] France ............................. 76 23006

[51] Int. Cl.² ............................................. C21C 5/40
[52] U.S. Cl. ..................................... 266/89; 266/158
[58] Field of Search .................................. 266/89, 158

[56] References Cited
U.S. PATENT DOCUMENTS

| 3,332,676 | 7/1967 | Namy | 266/158 X |
|---|---|---|---|
| 3,908,969 | 9/1975 | Baum et al. | 266/158 X |
| 3,972,708 | 8/1976 | Baum | 266/158 X |
| 4,031,819 | 6/1977 | Applewhite | 266/158 X |
| 4,040,608 | 8/1977 | Vicard | 266/158 X |

Primary Examiner—Roy Lake
Assistant Examiner—Paul A. Bell
Attorney, Agent, or Firm—Haseltine, Lake & Waters

[57] ABSTRACT

In an installation for the collection of gases emitted by a tiltable converter which includes an enclosure for the converter connected to a suction duct, a damper for controlling the draught in the suction duct is provided, the damper being controlled in dependence on the difference in pressures inside and outside the enclosure and the orientation of the axis of the converter so that the pressure differential is maintained at one level when the converter is vertical and at another level when the converter is non-vertical.

4 Claims, 1 Drawing Figure

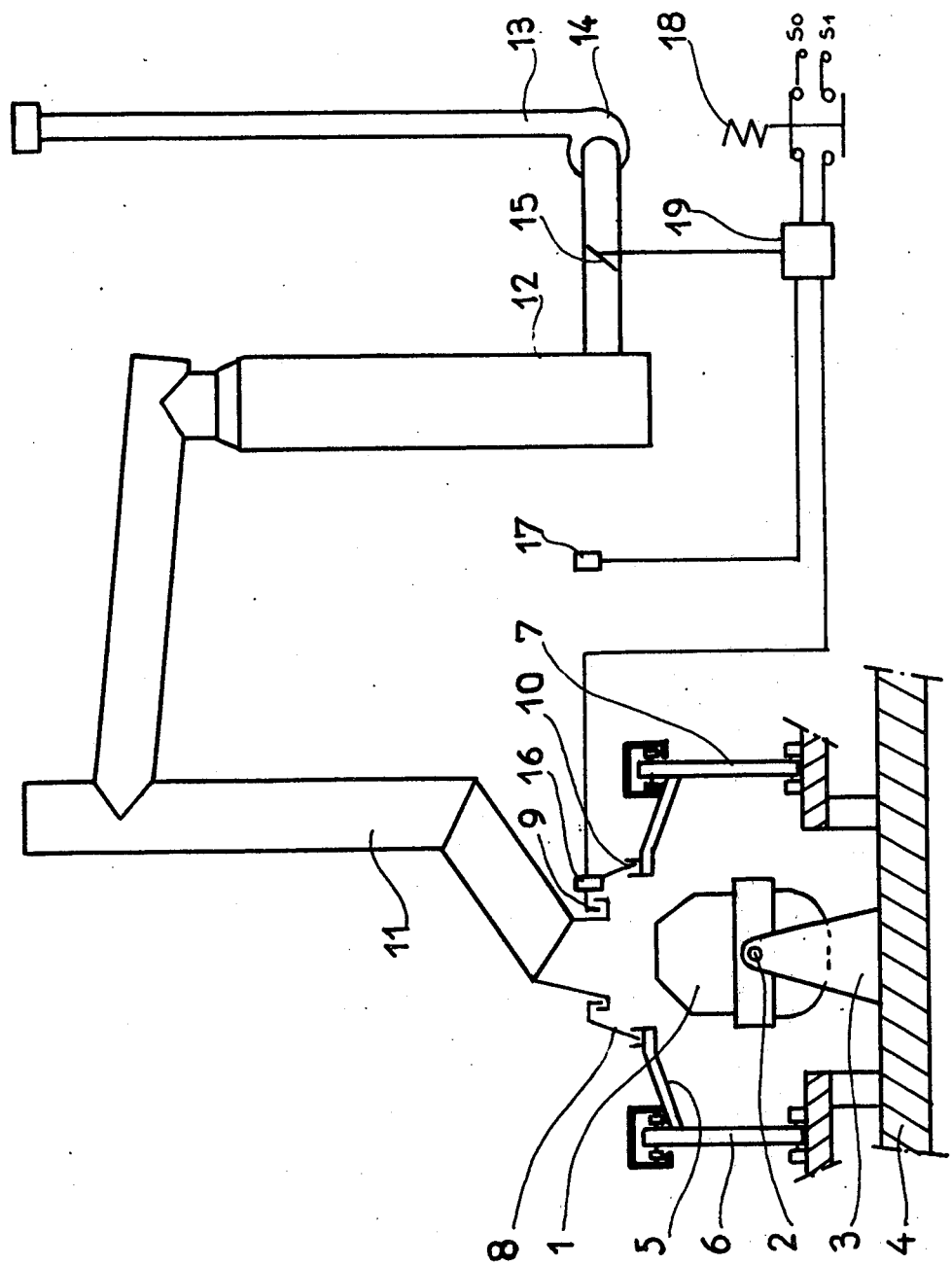

INSTALLATION FOR THE COLLECTION OF GASES EMITTED BY A TILTABLE CONVERTER

FIELD OF THE INVENTION

The present invention relates to the collection of the gases and fumes released from a converter during the course of its operation.

BACKGROUND

Installations are known in which a converter, which can tilt about a horizontal axis, is enclosed in an enclosure which surrounds it more or less completely, the enclosure being equipped with doors to enable charging of the converter and being surmounted by a hood which receives and sucks in the gases leaving the mouth of the converter when it is in the vertical position during refining, and which sucks in the fumes which are released into the enclosure when the converter is in a sloping position, for example, during charging operations.

The disadvantage of these known installations is that the gas leaving the converter in the course of refining, when it is in the vertical position, which is a gas rich in carbon monoxide and hence combustible, is completely burnt, no means being provided for carrying out collection without combustion.

That has the disadvantage, if it is desired to recover the heat of combustion of these gases, of its being necessary immediately to produce steam, of its being necessary to cool hotter gases and of having to extract dust from larger volumes than when collecting without combustion.

It is for this reason that it has already been proposed to connect the mouth of the converter when the latter is in the vertical position, to the suction duct by means of a sleeve which has a possibility of telescopic movement with respect to the suction duct. When the converter is in the vertical position there is then a substantially airtight connection between the converter mouth and the suction duct. When the converter is not in the vertical position the sleeve is raised and connected in a substantially airtight fashion to the enclosure surrounding the converter and to the duct for sucking away the gases.

It is in fact to be observed that in view of the large dimensions of a converter mouth, the temperature of the gases escaping from this mouth, the risks of fouling and spatter to which anything located in the proximity of this spout is exposed, the control of the movement of members of large dimensions which are located in this region, is exposed to mishaps, just as the obtaining of airtightness achieved by bearing surfaces of large dimensions subject to deformation as a result of the high temperatures and fouling is difficult to ensure.

SUMMARY OF THE INVENTION

According to the present invention there is provided an installation for the collection of gases and fumes emitted by a converter which is tiltable about a horizontal axis, the installation comprising an enclosure for receiving the converter and of sufficient dimensions to allow tilting of the converter and to surround the converter over at least the portion of the converter located above the horizontal plane containing the axis of tilt, said enclosure being provided with at least one door and being connected in an airtight manner to a fixed suction duct which is located above the mouth of the converter when the converter is vertical, at least a first pressure detector for detecting the pressure of gases in said enclosure and at least a second pressure detector for detecting the pressure of gases outside said enclosure, said detectors being connected to a regulator for controlling means for adjusting the draught in said suction duct for maintaining the difference in the pressures detected by said first and said second detectors at a first predetermined value when the converter is in a vertical position and at a second predetermined value when the converter is in a non-vertical position.

BRIEF DESCRIPTION OF THE DRAWING

The invention will be more fully understood from the following description of an embodiment thereof, given by way of example only, with reference to the accompanying drawing.

In the drawing the single FIGURE shows diagrammatically an embodiment of an installation in accordance with the present invention.

DETAILED DESCRIPTION

In the drawing a converter 1 is shown mounted to tilt about trunnions 2 carried by two pedestals 3 fixed to the floor 4. An enclosure 5 surrounds the converter. This enclosure is shown as being equipped with two doors 6 and 7. The enclosure 5 is connected by a removable part 8 to a suction duct 11 which includes a dust-extraction device 12. Seals 9 and 10 are provided to make the connection airtight.

A fan 14 mounted in the duct 11 sucks in the gases through a damper 15 and expels them into a flare 13. Pressure pick-ups such as pick-up 16, mounted in the removable part 8 which forms an extension of the enclosure, send electrical signals to a regulator 19 which also receives an electrical signal from a pressure pick-up 17 located outside the enclosure. This regulator 19 also receives an electrical signal which represents a nominal value So or S1 depending upon whether the contactor 18 of a switch is energized or not which in turn depends on whether the converter is in the vertical position or not.

The regulator 19 is designed to maintain the difference between the pressures measured by the pickups 16 and 17 at a value equal to So when the contactor 18 is not energized, that is to say, when the converter is in the vertical position. If the pressure at pickup 16 is too great the regulator 19 increases the draught by opening damper 15 and closes the damper down in the contrary situation.

By adjustment of the value of So the amount of air which enters the enclosure 5 may be controlled and hence the degree of combustion of the gases leaving the converter can be controlled. The selection of a sufficiently accurate regulation chain enables a gas to be extracted, of which only a very low percentage is burnt.

When the converter is no longer in the vertical position, the contactor 18 is energized and the regulator 19 adjusts the damper so that the pressure drop in the enclosure 5 is equal to S1.

If a sufficiently high value is assigned to S1 it will be possible then to suck in at the maximum rate with maximum draught and make the best use of the capacities of the fan for sucking away the fumes which are being released in the enclosure.

The removable part 8 may be made integral with the enclosure 5 or with the duct 11 or even with both since, as has been seen, it remains fixed in position during operation of the converter and there is airtightness between the part 8 and the assembly formed by the enclosure 5 and between the part 8 and the duct 11.

However, its mobility facilitates dismantling of the portion of the duct located immediately above the converter and enables relative movements of the enclosure 5 and the duct 11 due to expansion, to be absorbed.

Of course it is possible without departing from the scope of the invention as defined by the appendent claims to conceive of variants and improvements in detail as well as to visualize the use of equivalent means.

There is thus provided an installation which enables, during refining, a collection of the gases which is effected practically without combustion, and without the need for moving members in order to modify the way in which the converter mouth, the enclosure which surrounds it, and the suction duct are connected together.

What is claimed is:

1. An installation for the collection of gases and fumes emitted by a converter which is tiltable about a horizontal axis, the installation comprising:
    an enclosure for receiving the converter and of sufficient dimensions to allow tilting of the converter and to surround the converter over at least the portion of the converter located above the plane containing the axis of tilt;
    a door in said enclosure;
    a suction duct secured to the enclosure near the top thereof;
    said duct being secured to said enclosure so as to be located above the mouth of the converter when the converter is vertical, the mouth of the converter being uncovered in the enclosure at all times;
    a first pressure detector for detecting the pressure of gases in said enclosure near the top thereof;
    a second pressure detector for detecting the pressure of gases outside said enclosure;
    means for adjusting the draught in said suction duct;
    a regulator for controlling said draught adjusting means; and
    means connecting said first and second pressure detectors to said regulator;
    said regulator being operable to control said draught adjusting means to maintain the difference in the pressures detected by said pressure detectors at a first predetermined value when the converter is vertical and at a second predetermined value substantially greater than the first value when said converter is non-vertical such that the draught in the suction duct is then maximum to provide maximum suction in the enclosure.

2. An installation as claimed in claim 1, including a removable intermediate part connecting said enclosure to said suction duct, airtight seals being arranged between said intermediate part and said suction duct and between said intermediate part and said enclosure.

3. An installation as claimed in claim 1, including switch means which is in a first position when the converter is in a vertical position and is in a second position when the converter is in a non-vertical position, and means for supplying first and second reference signals to said regulator and connected to said regulator through said switch means.

4. An installation as claimed in claim 1, wherein said draught adjustment means comprises a damper arranged in said suction duct.

* * * * *